United States Patent
Bekemeier et al.

(10) Patent No.: US 11,052,937 B2
(45) Date of Patent: Jul. 6, 2021

(54) SPLINED COMPONENT ASSEMBLY AND METHOD

(71) Applicant: STEERING SOLUTIONS IP HOLDING CORPORATION, Saginaw, MI (US)

(72) Inventors: Benjamin L. Bekemeier, Reese, MI (US); Troy M. Kinne, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 58 days.

(21) Appl. No.: 15/875,598

(22) Filed: Jan. 19, 2018

(65) Prior Publication Data
US 2019/0225257 A1    Jul. 25, 2019

(51) Int. Cl.
*B62D 3/12* (2006.01)
*F16H 55/26* (2006.01)
*F16D 1/108* (2006.01)
*F16H 57/00* (2012.01)
*B62D 1/16* (2006.01)

(52) U.S. Cl.
CPC ............. *B62D 3/12* (2013.01); *F16D 1/108* (2013.01); *F16H 55/26* (2013.01); *F16H 57/0025* (2013.01); *B62D 1/16* (2013.01)

(58) Field of Classification Search
CPC ......... Y10T 403/7033; Y10T 403/7026; F16D 1/072; F16D 1/06
USPC .................. 403/359.5, 359.6, 359.1; 74/422
See application file for complete search history.

(56) References Cited

U.S. PATENT DOCUMENTS

| | | | | |
|---|---|---|---|---|
| 2,108,679 A | * | 2/1938 | Kurti ................ | F16D 1/0876 192/69.91 |
| 3,608,936 A | * | 9/1971 | Karden ............. | F16B 21/12 403/316 |
| 4,421,191 A | * | 12/1983 | Bertin ............... | B62D 5/083 137/625.21 |
| 5,180,043 A | * | 1/1993 | Walker ............. | F16D 13/683 192/70.19 |
| 5,503,494 A | * | 4/1996 | Kamata ............ | F16D 1/0858 403/359.6 |
| 5,645,366 A | * | 7/1997 | Ishibashi .......... | F16C 3/035 403/357 |
| 5,896,970 A | * | 4/1999 | Prater .............. | F16D 13/52 192/70.2 |

(Continued)

FOREIGN PATENT DOCUMENTS

CN  1918393 A  2/2007
CN  106438931 A  2/2017

(Continued)

OTHER PUBLICATIONS

English translation of First Office Action regarding related CN App. No. 201910053303.2; dated Nov. 26, 2020.

*Primary Examiner* — Victor L MacArthur
*Assistant Examiner* — Gregory Robert Weber
(74) *Attorney, Agent, or Firm* — Dickinson Wright PLLC

(57) ABSTRACT

A rack and pinion assembly for a vehicle steering assembly includes a pinion shaft having a splined region comprising a plurality of splines extending longitudinally in an axial direction of the pinion shaft. The rack and pinion assembly also includes an axial retention feature integrally formed on the splined region to axially retain a component matable with the pinion shaft.

5 Claims, 4 Drawing Sheets

(56) References Cited

U.S. PATENT DOCUMENTS

| | | | | |
|---|---|---|---|---|
| 6,241,616 B1 * | 6/2001 | Lightcap | ............... | F16C 3/03 403/359.5 |
| 6,508,480 B2 * | 1/2003 | Smith, Jr. | ............ | B62D 7/224 180/400 |
| 6,662,912 B2 * | 12/2003 | Smith, Jr. | ............ | B62D 7/224 188/267.1 |
| 7,475,612 B2 * | 1/2009 | Kaneiwa | ............ | B62D 5/0409 180/444 |
| 7,766,575 B2 * | 8/2010 | Huber | ............... | B21C 37/202 403/359.1 |
| 7,874,760 B2 * | 1/2011 | Steinrisser | ............ | F16D 1/06 29/557 |
| 7,900,763 B2 * | 3/2011 | Paumier | ............... | B60K 6/26 180/65.21 |
| 7,946,924 B2 * | 5/2011 | Neugebauer | ............ | F16C 3/03 403/359.6 |
| 7,972,078 B2 * | 7/2011 | Igarashi | ............... | F16D 1/101 403/359.1 |
| 8,043,023 B2 * | 10/2011 | Igarashi | ............... | F16D 1/101 403/359.1 |
| 8,079,912 B2 * | 12/2011 | Matsubara | ............ | F16C 3/02 403/359.6 |
| 9,005,038 B2 * | 4/2015 | Nabeshima | ............ | B62D 1/185 464/75 |
| 9,512,838 B2 * | 12/2016 | Krahn | ............ | B62D 5/14 |
| 9,567,811 B2 * | 2/2017 | Kenno | ............ | E21B 17/07 |
| 9,695,877 B2 * | 7/2017 | Saha | ............ | F16D 1/104 |
| 10,207,733 B2 * | 2/2019 | Yoshida | ............ | B62D 5/04 |
| 2014/0215758 A1 | 8/2014 | Franklin et al. | | |
| 2018/0223910 A1 * | 8/2018 | Aiba | ............ | F16D 3/387 |
| 2019/0011006 A1 * | 1/2019 | Dong | ............ | F16D 69/026 |

FOREIGN PATENT DOCUMENTS

| | | | | |
|---|---|---|---|---|
| CN | 206111825 U | | 2/2017 | |
| CN | 106471347 A | | 3/2017 | |
| FR | 2819562 A1 * | | 7/2002 | ............ F16D 1/072 |

* cited by examiner

SPLINED COMPONENT ASSEMBLY AND METHOD

FIELD OF INVENTION

The embodiments disclosed herein relate to vehicle steering column assemblies and, more particularly, to a rack and pinion assembly for such steering columns.

BACKGROUND OF INVENTION

Rack and pinion assemblies in vehicle steering applications are utilized to transfer motion of one element, such as a steering shaft, to another component, such as road wheels. Typically, a rotor component is axially retained to a pinion using a press-on retaining ring, or "no-back washer." The pinion contains an external involute spline that corresponds to an internal involute spline on the rotor component to prevent relative rotational movement between the pinion and rotor component. The rotor component is pressed onto the pinion until bottoming against a shoulder. The retaining ring, or "no-back" washer is pressed onto the pinion behind the rotor component to constrain the rotor component axially.

The retaining ring adds part count and cost to the overall assembly. Additionally, there may be assembly challenges associated with such rings. Finally, once installed, rework of the pinion assembly and housing becomes difficult, possibly resulting in damage.

SUMMARY OF INVENTION

According to one aspect of the disclosure, a rack and pinion assembly for a vehicle steering assembly includes a pinion shaft having a splined region comprising a plurality of splines extending longitudinally in an axial direction of the pinion shaft. The rack and pinion assembly also includes an axial retention feature integrally formed on the splined region to axially retain a component matable with the pinion shaft.

According to another aspect of the disclosure, a method of manufacturing a splined component is provided. The method includes forming a splined region, the splined region comprising a plurality of splines extending longitudinally from a first end to a second end. The method also includes forming an axial retention feature integrally formed on the splined region to axially retain a component matable with the splined component.

According to yet another aspect of the disclosure, a splined component assembly includes a splined region of a splined component, the splined region comprising a plurality of splines extending longitudinally from a first end to a second end, the splines defining a major diameter and a minor diameter. Also included is an axial retention feature integrally formed on the minor diameter and extending radially outwardly therefrom to axially retain a component matable with the splined component.

These and other advantages and features will become more apparent from the following description taken in conjunction with the drawings.

BRIEF DESCRIPTION OF EACH FIGURE OF DRAWING

The subject matter that is regarded as the subject invention is particularly pointed out and distinctly claimed in the claims at the conclusion of this specification. The foregoing and other features and advantages of the invention are apparent from the following detailed description of non-limiting exemplary embodiments of the invention taken in conjunction with the accompanying drawing thereof in which:

DETAILED DESCRIPTION OF EMBODIMENTS OF INVENTION

Referring now to the Figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
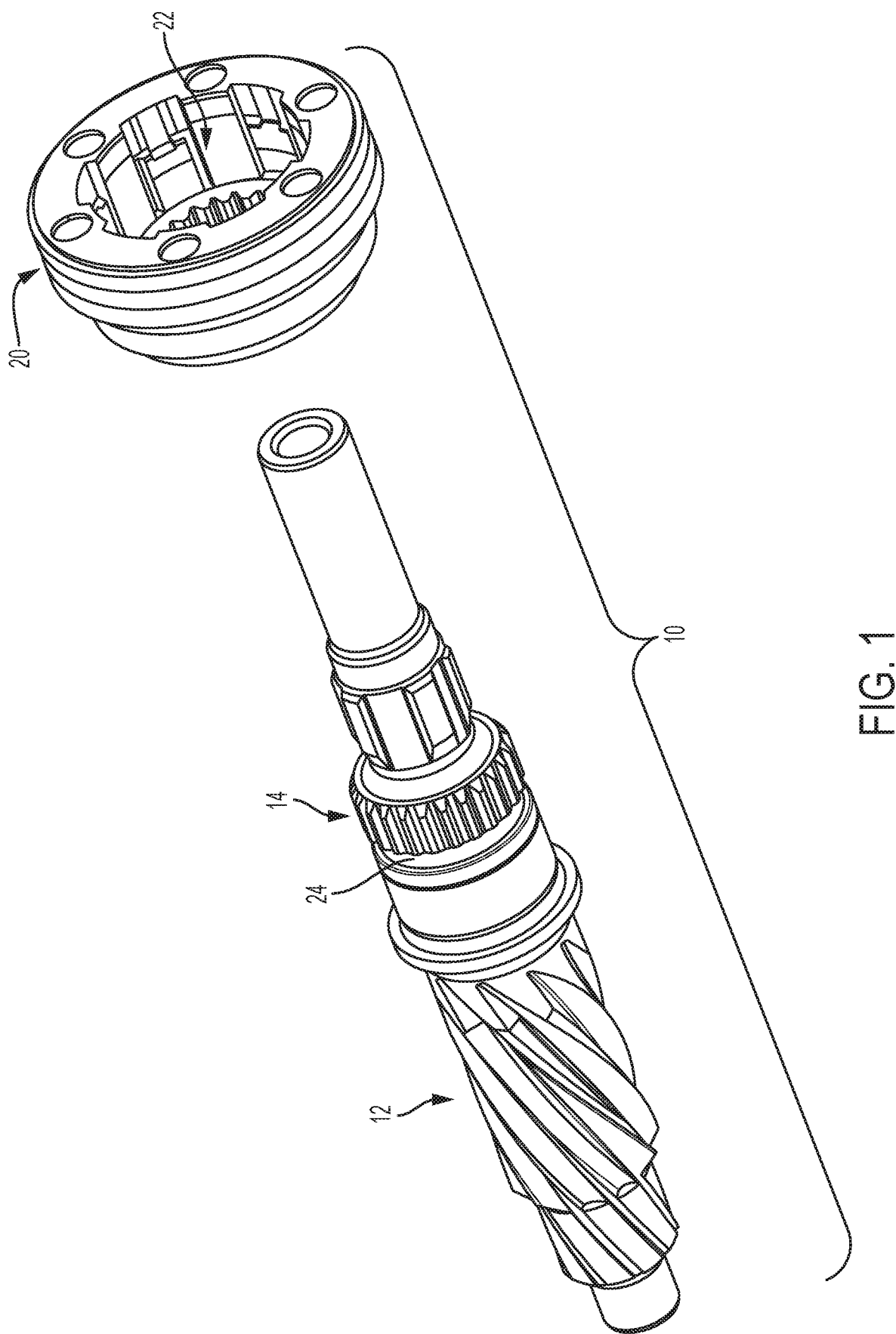
FIG. 1 is a perspective view of a pinion shaft and a component matable therewith.

Referring now to FIG. 1, a portion of a rack and pinion assembly is shown and is referenced generally with numeral 10. The rack and pinion assembly 10 is part of a steering column system for a vehicle in some embodiments. In some embodiments, the steering column system is an electric power steering system that utilizes the rack and pinion assembly 10. The assembly 10 includes a toothed rack (not shown) and a pinion shaft 12 located under a gear housing. During operation, as a hand wheel (not shown) is turned by a vehicle operator, one or more steering columns turns the pinion shaft. Rotation of the pinion shaft moves the toothed rack, which moves tie rods, which in turn move respective steering knuckles, thereby turning respective road wheels.

Although described above as a pinion gear shaft utilized in a rack and pinion application, it is to be understood that any component requiring a splined surface and mating to another component may benefit from the embodiments disclosed herein. In particular, even non-automotive applications may benefit from the embodiments disclosed herein. Therefore, it is to be understood that the terms "pinion shaft" and "splined component", as used herein may be used interchangeably.

As shown in FIG. 1, the pinion shaft 12 extends longitudinally in an axial direction and includes multiple features therealong. A splined region 14 is formed on the pinion shaft 12. The splined region 14 includes a plurality of splines.

As shown, a component 20 having a central aperture 22 is to be mated with the pinion shaft 12. Splines corresponding to the splines of spline region 14 extend radially inwardly from the central aperture 22 to form a meshed, involute spline arrangement in an assembled condition. In the rack and pinion assembly 10, the component 20 is a rotor component, such as a lower rotor. The pinion shaft 12 and the component 20 are shown in a disassembled condition in FIG. 1 and in an assembled condition in FIG. 6. The component 20 is mated to the pinion shaft 12 by moving the component 20 in direction A (FIG. 1). The component 20 is moved axially along the pinion shaft in direction A until the component 20 abuts a shoulder 24 formed on the pinion shaft 12.

Figure 2:
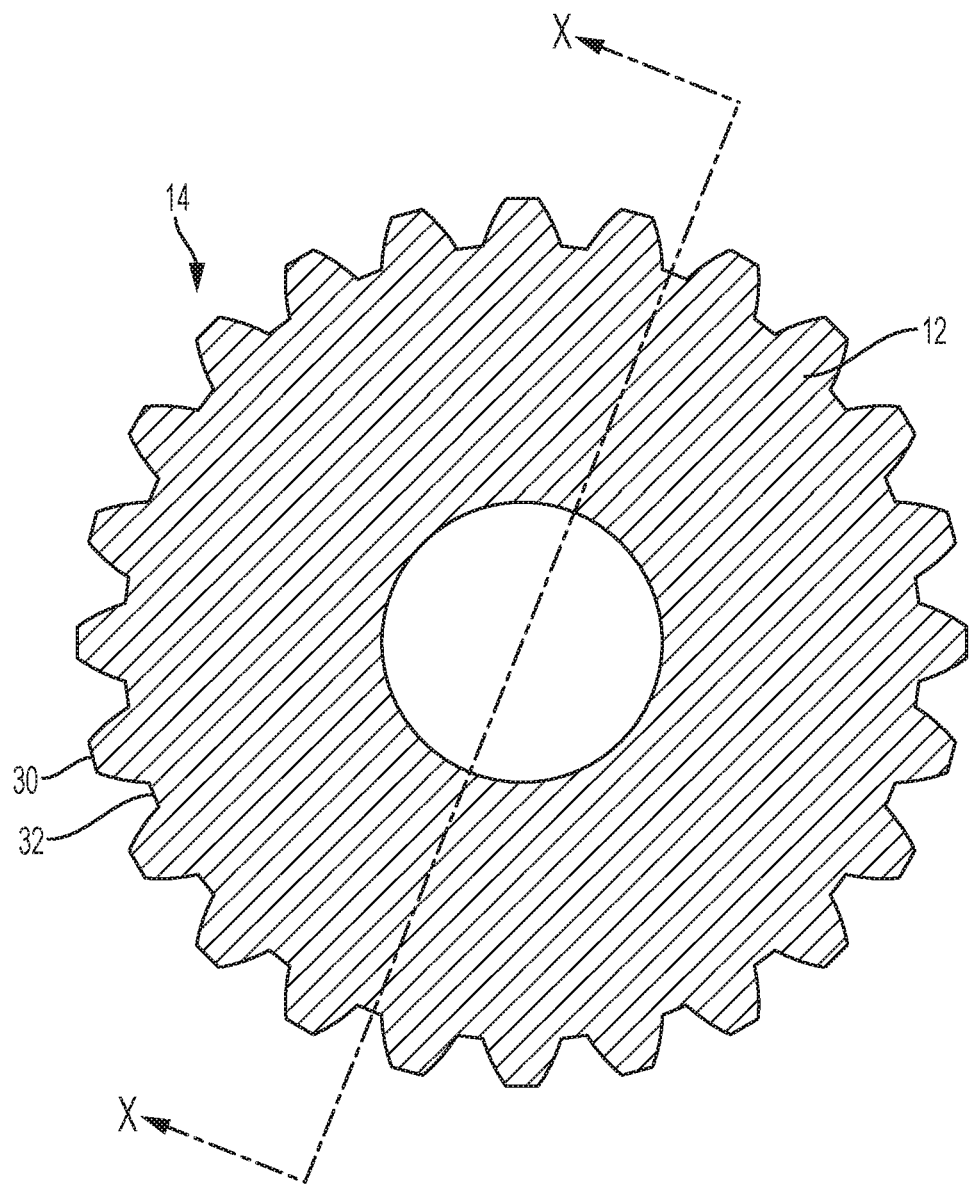
FIG. 2 is a sectional view of a splined region of the pinion shaft.

Referring now to FIG. 2, a sectional view of the pinion shaft 12 is illustrated. The illustrated section is through the splined region 14 of the pinion shaft 12. The plurality of splines 14 define a major diameter 30 at a radially outermost location of the splines and a minor diameter 32 at a radially innermost location of the splines. Each of the splines extend in a longitudinal direction that substantially corresponds to the overall longitudinal direction of the pinion shaft 12.

Figure 3:
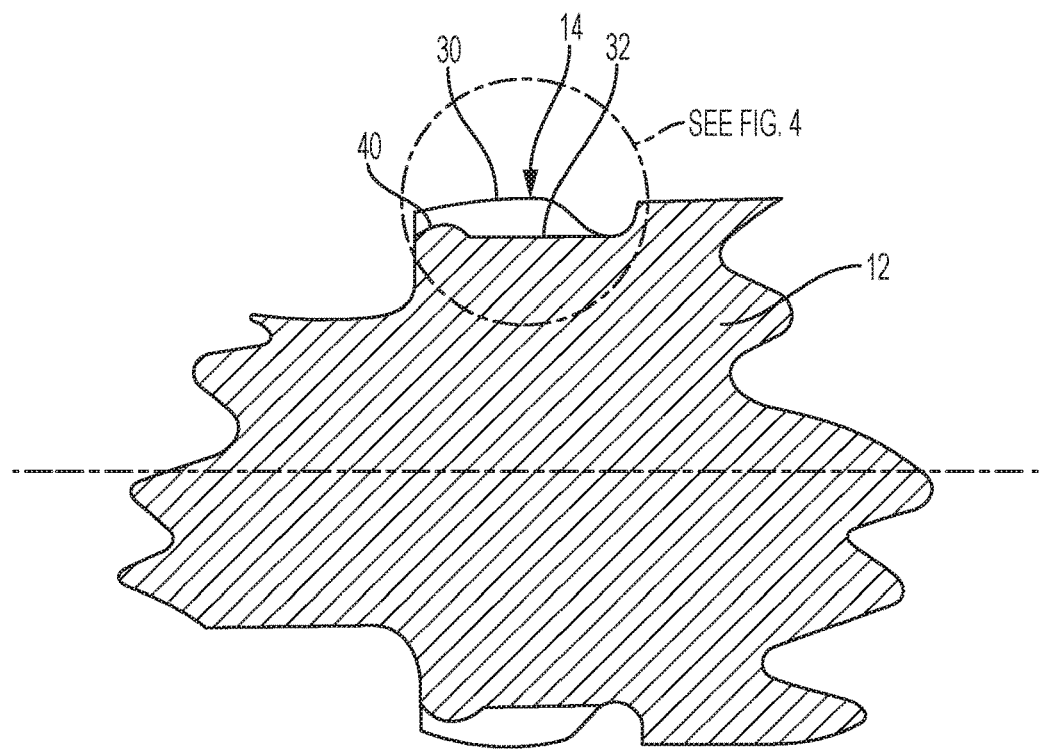
FIG. 3 is a cross-sectional view of the splined region taken along section X-X.
Figure 4:
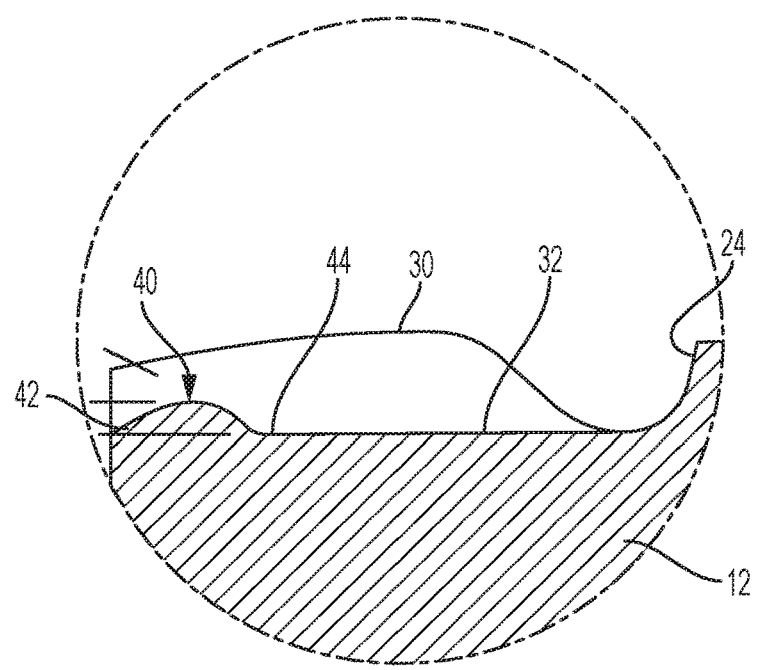
FIG. 4 is an enlarged view of a portion of the splined region illustrating an axial retention feature according to an aspect of the disclosure.
Figure 5:
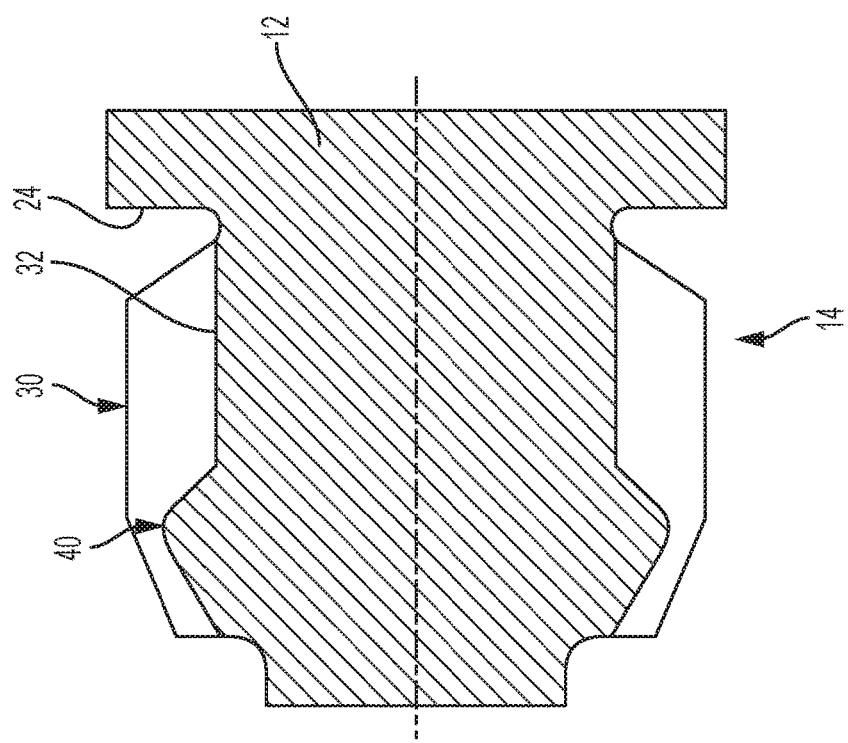
FIG. 5 is a cross-sectional view of the splined region taken along section X-X illustrating the axial retention feature according to another aspect of the disclosure.

FIGS. 3-5 illustrate an axial retention feature 40 that is integrally formed with the pinion shaft 12 within the splined region 14. Integrally forming the axial retention feature 40 with the pinion shaft 12 is defined as forming the feature 40 and the pinion shaft 12 of the same material, with the feature 40 not being easily or repeatedly removable from the pinion shaft 12. In some embodiments, a common tool forms the splined region 14 and the axial retention feature 40 during a single operation. The axial retention feature 40 is formed on the minor diameter 32 of the splined region 14 and extends radially outwardly therefrom, but to an extent that is radially inward of the major dimeter 30. The axial retention feature 40 extends longitudinally from a first end 42 to a second end 44 in substantially the axial direction of the pinion shaft 12. In some embodiments, the first end 42 corresponds to an end of the splined region 14.

The axial retention feature 40 is a protrusion from the minor diameter 32 of the splined region 14, as described above. The specific geometry of the axial retention feature 40 may vary depending upon the particular application of use. Two examples are shown in FIGS. 4 and 5. As shown, a steeper angle of the protrusion may be present (FIG. 5) relative to other embodiments (FIG. 4). These are merely illustrative and it is contemplated that numerous alternative geometries may be utilized. Similarly, the particular dimensions—actual and relative to the splines—may vary depending upon the application. Varying the size and the geometry allows customization for axial retention force.

Figure 6:
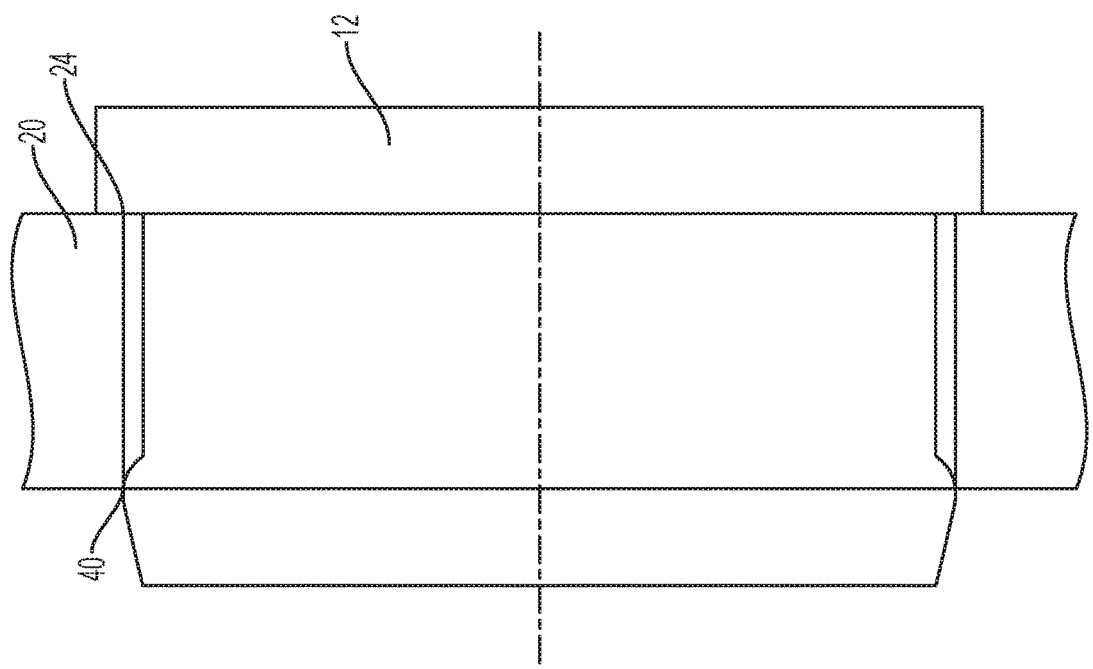
FIG. 6 is an elevational view of the pinion shaft and the component in an assembled condition.

As shown in FIG. 6, the component 20 is pushed along the pinion shaft 12 to form the involute spline assembly until the component 20 abuts the shoulder 24 of the pinion shaft 12. In this position, the component 20 is axially retained in one axial direction by the shoulder 24 and in an opposite axial direction by the axial retention feature 40. At least the splines of the component 20 are formed with a material that allows for deformation of the splines during installation over the axial retention feature 40. In some embodiments, the material is elastically deformable, thereby flexing the splines to accommodate the larger diameter of the axial retention feature 40. The splines of the component 20 and the axial retention feature 40 are in an interference fit condition in the fully assembled condition, as shown in FIG. 6.

The embodiments disclosed herein axially constrain the mating component, thereby eliminating the need for a retaining ring or the like, without adding additional components. The interference condition facilitates improvements in rework or teardown processes by reducing the likelihood of damaging the pinion shaft 12, the mating component 20, or a housing. The manufacturing process is simplified with the embodiments disclosed herein since the axial retention feature 40 can be rolled into the pinion shaft 12 with the same tool that rolls the splines.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

Having thus described the invention, it is claimed:

1. A rack and pinion assembly for a vehicle steering assembly comprising:
   a rotor component having a mating spline portion defining a central aperture;
   a pinion shaft having a splined region comprising a plurality of splines extending longitudinally in an axial direction of the pinion shaft; and
   an axial retention feature integrally formed on the splined region between a pair of adjacent splines to axially retain the rotor component which is matable with the pinion shaft, the plurality of splines defining a major diameter and a minor diameter, the axial retention feature extending radially outwardly from the minor diameter, wherein the axial retention feature extends axially from a first end of the axial retention feature to a second end of the axial retention feature, the first end located at an end of the splined region, the axial retention feature having a first inclined segment and a second inclined segment, the first inclined segment angling away from the minor diameter between the first end and an apex of the axial retention feature, the second inclined segment angling toward the minor diameter between the apex and the second end of the axial retention feature, the pinion shaft further comprising a shoulder axially spaced from the splined region, the rotor component matable with the pinion shaft being disposed between the axial retention feature and the shoulder in an assembled condition.

2. The rack and pinion assembly of claim 1, wherein a surface of the rotor component is formed of plastic, the surface elastically deforming during assembly and disposed in an interference fit with the axial retention feature in an assembled condition.

3. The rack and pinion assembly of claim 1, wherein the splined region and the axial retention feature are formed with the same tool.

4. A method of manufacturing a splined component comprising:
   forming a splined region, the splined region comprising a plurality of splines extending longitudinally from a first splined region end to a second splined region end; and
   forming an axial retention feature integrally on the splined region between a pair of adjacent splines to axially retain a rotor component matable with the splined component, wherein the plurality of splines defines a major diameter and a minor diameter, wherein forming the axial retention feature comprises forming the axial retention feature on the minor diameter and extending radially outwardly therefrom, wherein the axial retention feature extends axially from a first end of the axial retention feature to a second end of the axial retention feature, the first end of the axial retention feature located at the first splined region end, the axial retention feature having a first inclined segment and a second inclined segment, the first inclined segment angling away from the minor diameter between the first end and an apex of the axial retention feature, the second inclined segment angling toward the minor diameter between the apex and the second end of the axial retention feature.

5. The method of claim 4, wherein the splined region and the axial retention feature are formed with the same tool.

* * * * *